W. W. VOSPER.
POWER MEANS FOR WORK THREADING OR CUTTING UNITS.
APPLICATION FILED OCT. 26, 1918.
1,344,280.
Patented June 22, 1920.
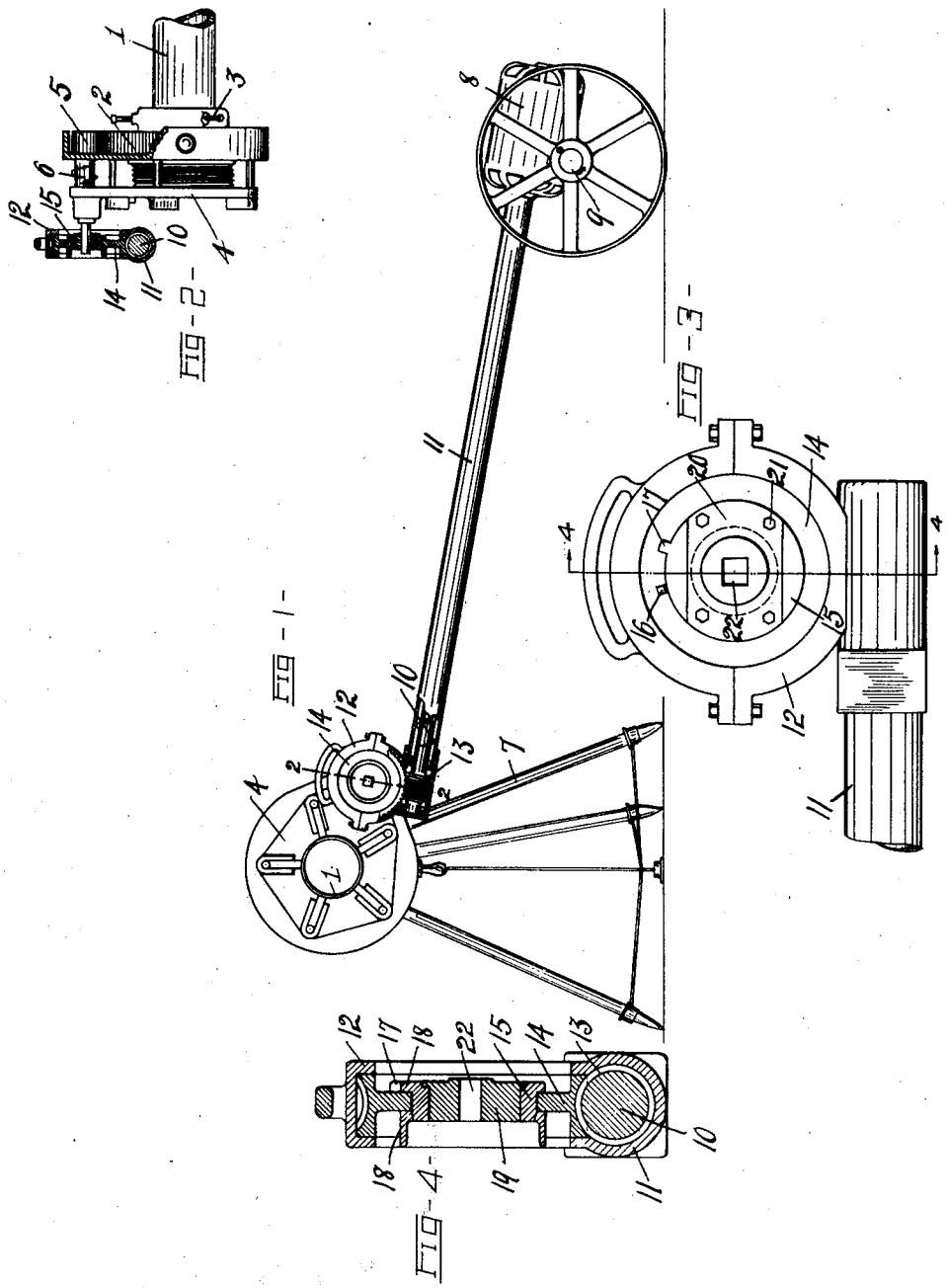
INVENTOR
William W. Vosper,
By Owen, Owen & Crampton.
His attys.

UNITED STATES PATENT OFFICE.

WILLIAM W. VOSPER, OF TOLEDO, OHIO.

POWER MEANS FOR WORK THREADING OR CUTTING UNITS.

1,344,280. Specification of Letters Patent. Patented June 22, 1920.

Application filed October 26, 1918. Serial No. 259,803.

*To all whom it may concern:*

Be it known that I, WILLIAM W. VOSPER, a citizen of the United States, and a resident of Toledo, in the county of Lucas and State of Ohio, have invented a certain new and useful Power Means for Work Threading or Cutting Units; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

This invention relates particularly to power means for work cutting or threading units of the type adapted to be mounted on the work to be cut or threaded and having a rotatable die carrying head provided with a drive pinion and shaft for revoluble movements therewith and rotatable movements relative thereto, with the pinion in mesh with a stationary gear fixed to the work, whereby a rotation of the pinion causes it to travel orbitally around the gear and to impart rotation to the head.

The object of my invention is the provision of a simple, improved and efficient power means of the class described which is adapted to connect with and impart rotation to the pinion shafts of apparatus of the character described, and also the provision of means of this class which is capable of being easily and quickly connected to or disconnected from the pinion shafts of such devices.

The invention is fully described in the following specification, and while, in its broader aspect, it is capable of embodiment in numerous forms, a preferred embodiment thereof is illustrated in the accompanying drawings, in which,—

Figure 1 is a front elevation of a thread cutting unit mounted on a work piece, with a power unit embodying the invention in driving connection therewith and partly broken away. Fig. 2 is a fragmentary side elevation thereof with a portion of the cutting unit broken away and with the connected power unit in section on the line 2, 2 in Fig. 1. Fig. 3 is an enlarged rear elevation of the apparatus connecting end of the power unit, and Fig. 4 is a section on the line 4, 4 in Fig. 3.

Referring to the drawings, 1 designates a pipe or other work piece, to be cut or threaded, 2 a stationary gear sleeved on and fixed to the work by set-screws 3, or in any other suitable manner, and 4 the rotatable die-carrying head of the cutting or threading unit, which head carries a drive pinion 5 in mesh with the gear 2, whereby a rotation of said pinion will cause it to travel orbitally around the gear and impart rotation to the head. The shaft 6 carrying the pinion is journaled in the head 4 at one side of its axis and parallel thereto, and has its front end projected forward from the head and squared, in the present instance, to fit into the complemental socket of a crank or other turning agent. Work cutting or threading units of this character are common in the art and the construction thereof is well understood. The work may be supported and stationarily held by a stand 7, or in any other suitable manner.

The drive or power unit, in which the present invention resides, includes a motor 8 preferably, but not necessarily, of the electric type, which is mounted, in the present instance, on a wheeled support 9, but may be supported in any other suitable manner to adapt it to have free reciprocable movements. The motor shaft 10 extends therefrom in the direction of permissible movements of the motor and is incased in a tubular housing or hollow arm, which has a circular housing or gear incasing shell 12 mounted on one side of its outer end portion. The shaft 10 is provided at its outer end with a worm 13 in mesh with a worm wheel 14 mounted for free rotation in the housing 12. The worm wheel is of ring or annular form to provide a center opening in which a bushing 15 is mounted, preferably for limited rotary movements relative to the gear. Such relative movements are limited by coacting stop lugs 16 and 17 on the worm wheel and bushing, respectively. The bushing 15 is retained within the worm wheel by opposed circumferential edge flanges 18, 18, one of which is removable from the bushing to facilitate assembling.
A center or core piece 19 is removably fitted in the bushing 15 and provided, in the present instance, at one end with side flanges 20, which fit in complemental recesses provided in the respective end of the bushing and are secured thereto by screws 21. The center piece 19 is provided with a center opening 22 complemental to the front end of the pinion shaft 6 whereby a rotation of the center piece imparts rotation to the shaft. The purpose of providing the bushing 15 with a separate removable center piece 19 is to enable one center piece to be replaced by another having a center opening 22 of suitable size and shape to receive the pinion shaft, otherwise the bushing and center piece might comprise a single piece.

The use of my invention is as follows:— When a cutting or threading unit has been mounted on a work piece to be acted on, the power unit is engaged therewith by placing the center opening 22 of the center piece 19 over the pinion shaft 6 with the bushing 15 preferably turned to substantially the limit of its forward turning movement relative to the worm wheel. The motor is then started and first acts to drive the worm wheel forward to the limit of its permissible turning movement relative to the bushing and then effects a driving of the worm wheel and bushing together and imparts a consequent rotation to the pinion shaft to cause its pinion to travel around the gear 2 and impart rotation to the cutting head around the work. It is apparent that the worm wheel 14 not only has a shaft driving rotation around its own axis, but has an orbital movement with the pinion shaft around the axis of the work, thus imparting reciprocation to the motor which is mounted for such purpose. The purpose of providing for the initial relative movements between the worm wheel 14 and bushing 15 is to enable the motor to get fairly started before the load of turning of the cutting head is thrown thereon.

It is evident that I have provided a simple power unit for geared work cutting or threading units and that it is capable of being easily and quickly attached to or disconnected therefrom and also of movement as a whole with the pinion shaft in its orbital movements.

I wish it understood that my invention is not limited to any specific construction, arrangement or form of the parts, as it is capable of numerous modifications and changes without departing from the spirit of the claims.

Having thus described my invention, what I claim as new, and desire to secure by Letters Patent, is,—

1. The combination with a rotatable head having a drive shaft at one side of its axis geared to cause a rotation of the head and an orbital movement of the shaft when the shaft is rotated, of a motor, and means connecting said motor and shaft and operable to rotate the shaft, said motor and means being mounted for reciprocable movements to move with the shaft in its orbital movements.

2. The combination with a rotatable head having a drive shaft at one side of its axis geared to cause a rotation of the head and an orbital movement of the shaft when the shaft is rotated, of a motor, a shaft driven by and projecting from said motor, gearing connecting said motor shaft and drive shaft to impart rotation from one to the other, and a frame carrying said motor shaft and gearing, said motor and frame being mounted for movements with the drive shaft in its orbital movements.

3. The combination with a rotatable head having a drive shaft at one side of its axis geared to cause a rotation of the head and an orbital movement of the shaft when the shaft is rotated, of a motor mounted for reciprocal movements, a shaft extending from and driven by said motor, a gearing removably connecting said motor driven and drive shafts, and a housing inclosing said shaft and gearing and connected to said motor whereby reciprocatory movements are communicated to the motor from orbital movements of the pinion shaft.

4. The combination with a rotatable head having a drive shaft at one side of its axis geared to cause a rotation of the head and an orbital movement of the shaft when the shaft is rotated, of a motor, and means connecting said motor and shaft and operable to rotate the shaft, said means having members mounted for limited relative movements to permit an initial limited running of the motor before being subjected to the load of driving of said shaft.

5. The combination with a rotatable head having a drive shaft at one side of its axis geared to cause a rotation of the head and an orbital movement of the shaft when the shaft is rotated, of a bushing mounted on said shaft, a gear mounted on said bushing for limited rotary movements relative thereto, and a motor in driving connection with said gear.

6. The combination with a rotatable head having a drive shaft at one side of its axis geared to cause a rotation of the head and an orbital movement of the shaft when the shaft is rotated, of a gear mounted on said shaft to drive the same and having a core part capable of limited rotation relative thereto, a motor, driving connection between the motor shaft and said gear, and a housing carrying said gear, motor and connection for movement as a unit relative to said head.

7. A movably mounted motor, a shaft driven by and projecting from said motor, a gear disposed at one side of and driven by said shaft and adapted for driving engagement with a shaft, and a frame carrying said gear and shaft and rigidly connected to the motor housing, the motor shaft and frame being movable relative to the gear.

8. A movably mounted motor, a shaft driven by and projecting from said motor, meshing drive and driven gears connected to said shaft, the driven gear having a shaft engaging center member mounted for limited rotary movements relative thereto, and a housing retaining said gears in assembled relation and movable with said motor.

9. A movably mounted motor, a shaft driven by said motor, meshing drive and driven gears connected to said shaft, the driven gear being adapted for driving engagement with a rotatable member, and a frame carrying said gears, shaft and motor in assembled relation, the motor and shaft being capable of movement axially of the shaft relative to the driven gear.

In testimony whereof, I have hereunto signed my name to this specification.

WILLIAM W. VOSPER.